(12) United States Patent
Levine et al.

(10) Patent No.: US 11,068,467 B2
(45) Date of Patent: Jul. 20, 2021

(54) APPARATUS AND METHOD TO CREATE SECURE DATA BLOCKS TO VALIDATE AN INFORMATION SOURCE

(71) Applicant: Xerox Corporation, Norwalk, CT (US)

(72) Inventors: Jonathan Levine, Rochester, NY (US); Naveen Havannavar, Pittsford, NY (US); Howard Michael Tenney, Walworth, NY (US)

(73) Assignee: Xerox Corporation, Norwalk, CT (US)

(*) Notice: Subject to any disclaimer, the term of this patent is extended or adjusted under 35 U.S.C. 154(b) by 94 days.

(21) Appl. No.: 16/255,558

(22) Filed: Jan. 23, 2019

(65) Prior Publication Data

US 2020/0233852 A1    Jul. 23, 2020

(51) Int. Cl.
*G06F 16/23* (2019.01)
*G06F 9/451* (2018.01)

(52) U.S. Cl.
CPC .......... *G06F 16/2365* (2019.01); *G06F 9/451* (2018.02)

(58) Field of Classification Search
CPC .................................................. G06F 16/2365
See application file for complete search history.

(56) References Cited

U.S. PATENT DOCUMENTS

| 8,185,447 | B2 | 5/2012 | Myslinski |
| 8,321,295 | B1 | 11/2012 | Myslinski |
| 8,719,279 | B2 | 5/2014 | Albert |
| 9,177,053 | B2 | 11/2015 | Myslinski |
| 9,760,561 | B2 | 9/2017 | Myslinski |
| 2015/0032650 | A1* | 1/2015 | Mermelstein ......... H04W 4/021 705/318 |
| 2017/0177717 | A1 | 6/2017 | Raniere |
| 2019/0357049 | A1* | 11/2019 | Tali .......................... G06F 21/36 |
| 2019/0361867 | A1* | 11/2019 | Nilsson ............... G06F 16/2255 |
| 2019/0379660 | A1* | 12/2019 | Thirumavalavan ... H04L 51/046 |
| 2020/0092301 | A1* | 3/2020 | Coffing ................... H04L 63/12 |

FOREIGN PATENT DOCUMENTS

| CN | 108241727 A | 7/2018 |
| KR | 101869815 B1 | 6/2018 |

* cited by examiner

*Primary Examiner* — James Trujillo
*Assistant Examiner* — J Mitchell Curran (57) ABSTRACT

A method for creating a secure data block to validate an information source is disclosed. For example, the method is executed by a processor and includes receiving a story via a user interface, accessing a truth criteria database to identify a truth criteria associated with a category of the story, associating one or more parameters of the story to the truth criteria to create a map between the one or more parameters and the truth criteria, and creating one or more secure data blocks to record the map between the one or more parameters of the story and the truth criteria.

11 Claims, 6 Drawing Sheets

APPARATUS AND METHOD TO CREATE SECURE DATA BLOCKS TO VALIDATE AN INFORMATION SOURCE

The present disclosure relates generally to information technology and relates more particularly to creating secure data blocks to validate an information source.

BACKGROUND

In the past couple of years, disinformation, now known by the pop term "fake news," has led to a phenomenon in society and business where people can no longer tell what information is factual and what information is false. In some situations, false information is planted for malicious purposes to gain a business or political advantage. In other cases, people plant false information for their own entertainment.

While deliberate disinformation attacks have existed throughout history, social networks facilitate disinformation by allowing it to be seen instantly by hundreds of millions of people. Furthermore, a piece of valid news that goes viral can be instantly and globally refuted. Currently, people cannot tell whether the original story or the refutation (or neither) are accurate.

As we have seen in the past year, when the actual truth is elusive, social, political, and business problems may emerge with implications for personal reputation, public safety, domestic tranquility, business operations, national security, and even international stability. There have been no effective proposals to counter this situation.

Furthermore, the publicity around fake news may encourage more people to publish false stories, thereby creating an even larger quantity of false information. Currently, no effective solution to counter this social, political, personal, and business problem exists.

SUMMARY

According to aspects illustrated herein, there are provided a method and a non-transitory computer readable medium for creating a secure data block to validate an information source. One disclosed feature of the embodiments is a method that receives a story via a user interface, accesses a truth criteria database to identify a truth criteria associated with a category of the story, associates one or more parameters of the story to the truth criteria to create a map between the one or more parameters and the truth criteria, and creates one or more secure data blocks to record the map between the one or more parameters of the story and the truth criteria.

Another disclosed feature of the embodiments is a non-transitory computer-readable medium having stored thereon a plurality of instructions, the plurality of instructions including instructions which, when executed by a processor, cause the processor to perform operations that receive a story via a user interface, access a truth criteria database to identify a truth criteria associated with a category of the story, associate one or more parameters of the story to the truth criteria to create a map between the one or more parameters and the truth criteria, and create one or more secure data blocks to record the map between the one or more parameters of the story and the truth criteria.

Another disclosed feature of the embodiments is an apparatus comprising a processor and a computer-readable medium storing a plurality of instructions which, when executed by the processor, cause the processor to perform operations that receive a story via a user interface, access a truth criteria database to identify a truth criteria associated with a category of the story, associate one or more parameters of the story to the truth criteria to create a map between the one or more parameters and the truth criteria, and create one or more secure data blocks to record the map between the one or more parameters of the story and the truth criteria.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an apparatus and method for creating secure data blocks to validate an information source. As discussed above, "fake news" has led to a phenomenon in society and business where people can no longer tell what information is factual and what information is false. In some situations, false information is planted for malicious purposes to gain a business or political advantage or for personal reasons. Currently, there is no effective solution to counter the ability to easily publish and disseminate "fake new" over the Internet.

The present disclosure provides an apparatus and method that create a secure data block to validate an information source. The secure data block may be any type of current or future data block that is difficult to change by an individual once the data block is created. One example of a secure data block includes blockchain technology, or any future variations of blockchain technology.

A blockchain is a distributed database that is resistant to modification and provides a high level of security. Each record may be stored in a block. The blocks are encrypted and linked using a cryptographic technique called hashing. Each block contains a cryptographic hash of a previous block, a timestamp, and data. The blockchains may be managed by a peer-to-peer public network. Once a block is recorded, the data in any given block cannot be altered retroactively without alteration of all subsequent blocks, which requires consensus of the network majority.

The present disclosure may leverage secure data blocks, such as blockchains, to store truth-criteria for a news story or other published stories such as blogs. The reported story may be linked to the truth-criteria and stored in one or more blockchains.

In one embodiment, a graphical user interface may be modified to include a validation button. The validation button may automatically query the secure data blocks to obtain information associated with the story and the truth-criteria. As a result, a user may quickly verify the validity of a story using the apparatus and methods described herein.

Figure 1:
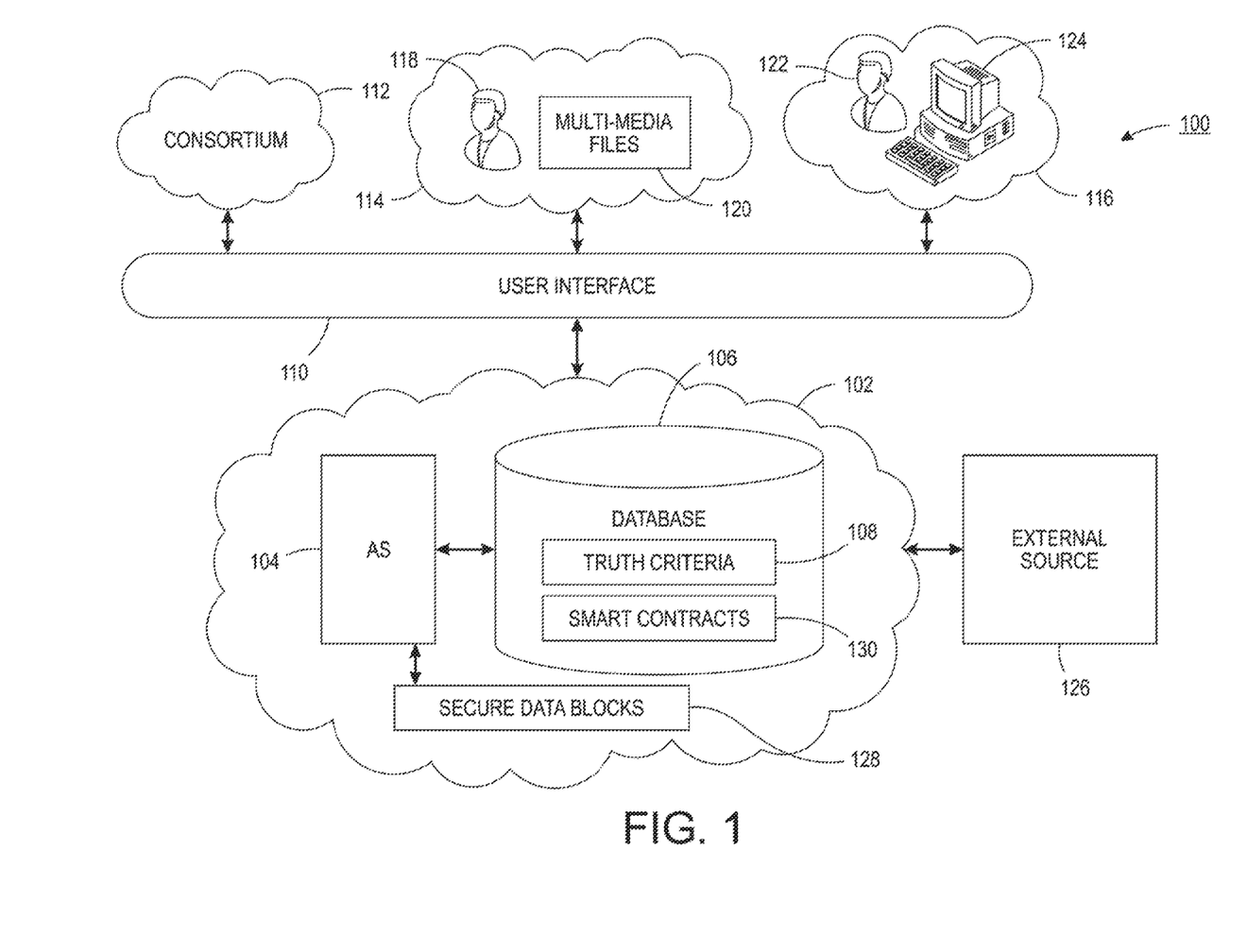
FIG. 1 illustrates a block diagram of a system of the present disclosure.

FIG. 1 illustrates an example system 100 to create secure data blocks to validate an information source of the present disclosure. In one embodiment, the system 100 may include an Internet protocol (IP) network 102. The IP network 102 may include an application server (AS) 104, a database (DB) 106, and secure data blocks 128. The AS 104 may be modified to perform the functions described herein.

The DB 106 may include a memory (e.g., a non-transitory computer readable medium) to store information. The DB 106 may store truth criteria 108 and smart contracts 130. The DB 106 may store additional types of information discussed below, such as for example, user log-in information, passwords, user profiles, news stories, multimedia associated with the news stories, and the like. Although a single AS 104 and a single DB 106 are illustrated in FIG. 1, it should be noted that the IP network 102 may include a distributed server and database architecture that includes a plurality of application servers and databases.

In one example, the AS 104 and the DB 106 may be managed and operated by a service provider that provides a service to automatically verify an information source or story that may be found on the Internet. The functions of the AS 104 may be provided as a unique graphical user interface (GUI) or an added on tool or widget to existing web browsers, as discussed in further details below. In addition, the AS 104 may leverage the security of blockchains for a new application in information source/news story validation.

It should be noted that the IP network 102 has been simplified for ease of explanation. The IP network 102 may include additional network elements and/or access networks that are not shown. For example, the IP network 102 may include a gateway, routers, switches, border elements, cellular access networks, broadband access networks, and the like.

Figure 2:
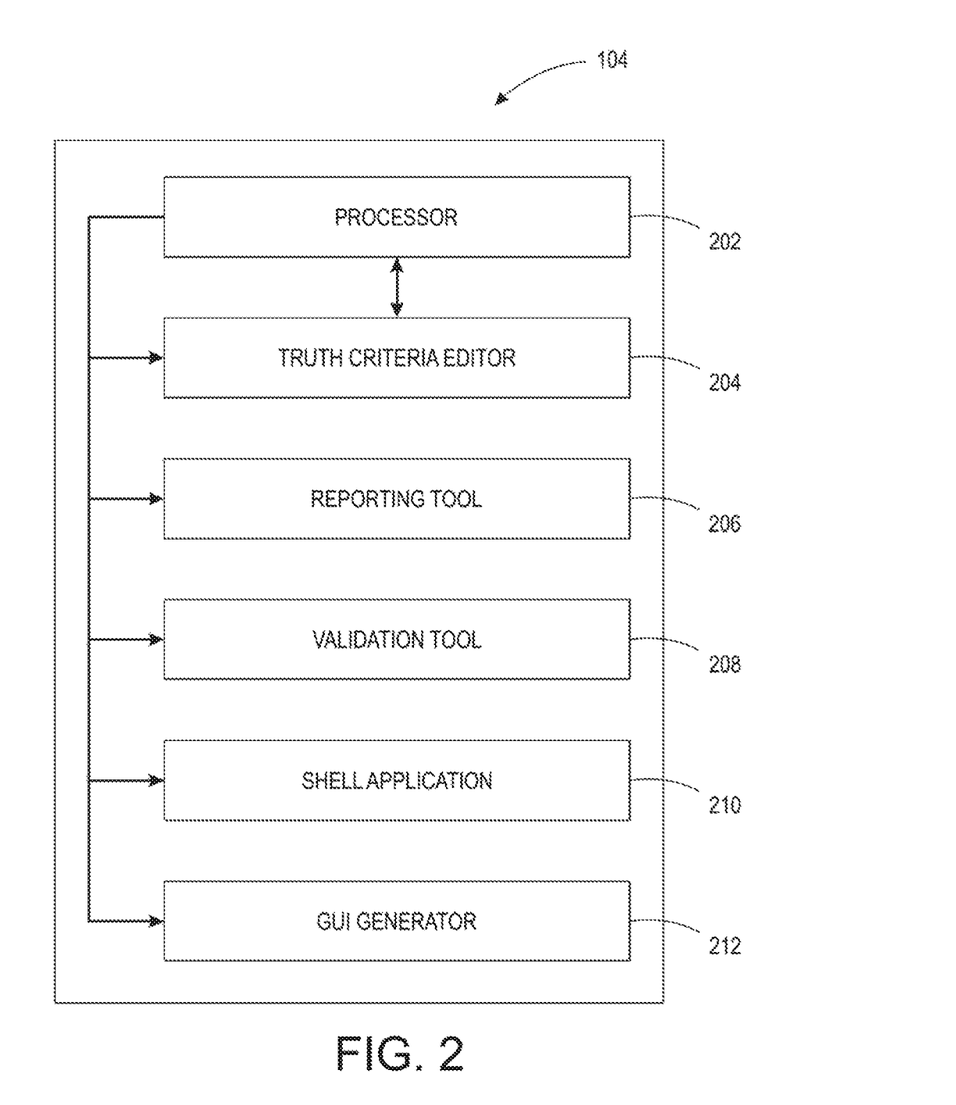
FIG. 2 illustrates a block diagram of an apparatus to create secure data blocks to validate an information source of the present disclosure.

FIG. 2 illustrates a block diagram of an example AS 104 of the present disclosure. In one embodiment, the AS 104 may include a processor 202, a truth criteria editor 204, a reporting tool 206, a validation tool 208, a shell application 210, and a GUI generator 212. The processor 202 may be communicatively coupled to the truth criteria editor 204, the reporting tool 206, the validation tool 208, the shell application 210, and the GUI generator 212. The processor 202 may execute and/or control operation of the truth criteria editor 204, the reporting tool 206, the validation tool 208, the shell application 210, and the GUI generator 212.

FIG. 2 may be discussed in further detail below in combination with FIG. 1. Referring back to FIG. 1, the system 100 may include a user interface 110. The user interface 110 may be accessed by different users, such as for example, a consortium 112, a news story location 114, and a user location 116. The user interface 110 may show different GUIs, information, and fields depending on which user is logged into the system 100 and the purpose of the user logging into the system 100. In one example, the GUI generator 212 may generate the appropriate GUIs for the user interface 110.

In one embodiment, the consortium 112 may be a group of news organizations, reporters, or bloggers that may establish the truth criteria 108. Therefore, while the creation of the truth criteria 108 may be restricted to certain users, for example certain members of the coalition or company, the truth criteria 108 and a mapping between the truth criteria 108 and a story, as discussed below, may be visible and available to anyone. The truth criteria editor 204 may provide fields and/or information to the consortium 112 to help create the truth criteria 108. The truth criteria 108 may include parameters or characteristics of a story, article, or any other type of published information that may allow a reader to accept the information as valid and/or true.

In one embodiment, the truth criteria editor 204 may enable and guide the consortium 112 through establishing the truth criteria 108 for different types of published information. For example, a set of truth criteria 108 may be established for war related news stories, another set of truth criteria 108 may be established for sports related news stories, another set of truth criteria 108 may be established for political related news stories, another set of truth criteria 108 may be established for entertainment related news stories, and the like. The truth criteria 108 may be established and one or more new secure data blocks 128 for the truth criteria 108 may be generated and stored in the secure data blocks 128.

In one embodiment, the secure data blocks 128 may be blockchain technology, as discussed above. The blockchains provide a security for data that is resistant to modification. Each member of the consortium 112 may be provided with access to the blockchains for the truth criteria 108. The blockchains may not be modified unilaterally by any single person in the consortium 112 as the changes to the blockchains may be public, and therefore, detectable. Rather, when the consortium 112 agrees to update a particular truth criteria 108, the update may be recorded in a new block of the blockchain. Thus, the integrity of the truth criteria 108 may be maintained by creating and using the blockchain for the truth criteria 108.

As noted above, the consortium 112 may establish the truth criteria 108. To illustrate for a new story, the truth criteria 108 may include an authorship validation, a reporting location validation, an electronic content location validation, a research location validation, a research document source validation, a human source validation the author's travel documents such as plane tickets, taxi rides, and the author's travel location such as global positioning system (GPS) coordinates of his/her ride to the reporting location, and the like. The authorship validation may have an author be able to demonstrate that he or she is an employee or legitimate agent of at least one of the participating organizations.

The reporting location validation may have an author be able to demonstrate that he or she is posting the story from the location indicated in the story. The criteria may include plane tickets, auto-rental, travel receipts at the location (e.g., taxi receipts, gas receipts, dinner receipts, and the like), etc. that can demonstrate the author was at the location.

The electronic content location validation may have the author demonstrate that any images, video, audio, or any other electronic content were generated at the location indicated at the story. The research location validation may have the author demonstrate that he or she did his or her research in the location indicated in the story.

The research document source validation may have the author demonstrate the location and/or source of specific documents (e.g., text, video, audio, and the like) that he or she saw or heard while doing research for the story at the validated locations. The research document source validation may also include a date and time of when the document was read, seen, or heard.

The human source validation may have the author document any conversation with human sources. The identities of the human sources may be remain hidden, but documentation of the conversation and its content may be made available. Although some examples of the truth criteria 108 are provided above, it should be noted that different types of stories may have different parameters or validations for the truth criteria 108.

In one embodiment, at the news story location 114 an author 118 may generate a news story. The author 118 may be a reporter who wants to publish a story from a particular location. The author 118 may log into the system 100 via the user interface 110 to report the story. The story may be saved in the DB 106. In one example, the news story may include multi-media files 120. The multi-media files may include video files, audio files, image files, and the like.

In one embodiment, the author 118 may be prompted to provide information or files for each truth criteria 108 for the type of news story the author 118 is reporting. For example, the reporting tool 206 may provide fields or information in a GUI of the user interface 110 generated by the GUI generator 212 for the author 118 to publish a story. The reporting tool 206 may access one or more secure data blocks 128 that contain data on the truth criteria 108 for the category or type of news story being reported by the author 118. The author 118 may enter the information via the user interface 110 or attach files that provide documentation related to the truth criteria 108.

In one embodiment, the reporting tool 206 may cause the smart contracts 130 to be executed by the AS 104 to automatically gather information for the corresponding truth criteria 108. The smart contracts 130 may be instructions that are executed by the AS 104 to automatically obtain data and associate the data with certain parameters (e.g., one or more of the truth criteria 108). The smart contracts 130 may generate the map between the data and the truth criteria, as discussed below. For example, the author 118 may log in (e.g., via a username and password) to indicate a news story is being generated. The AS 104 may create and execute a smart contract 130 for the author 118 to collect information associated with the truth criteria 108 stored in the secure data blocks 128.

For example, an external source 126 may be communicatively coupled to the AS 104. When the smart contract 130 is being executed, the smart contract 130 may retrieve or receive data from the external source 126. The external source 126 may include multiple external sources 126. In one embodiment, the author 118 may have a user profile stored in the DB 106 with links to personal calendars, itineraries, and the like. The external source 126 may be a calendar application of the author 118 to verify the travel plans of the author 118, appointments with human sources for the human source validation, and the like.

For example, the external source 126 may be an airline company and flight information of the author 118 may be retrieved to perform the reporting location validation. The external source 126 may be an access list for a building that indicates the author 118 swiped for entry at the location.

In one embodiment, the smart contracts 130 may automatically obtain metadata from the multi-media files 120 to perform other types of validation for the truth criteria 108. For example, the multi-media files 120 may include metadata that indicates when the file was created, where the file was created, global positioning system (GPS) information, and the like. The date and time can be used to perform the electronic content location validation. For example, the date and time can validate the content was generated at the time the news story was reported. The GPS data can validate that the content was generated at a location where the news story was reported, and so forth.

In one embodiment, the reporting tool 206 may associate the appropriate data with each criteria of the truth criteria 108 for the type of story that is being reported or published by the author 118. The association between the data and each criteria of the truth criteria 108 may create a map between the data and/or parameters and the truth criteria 108. The reporting tool 206 may generate one or more secure data blocks 128 to store the map, the story, and/or the associated data.

In one embodiment, the story may be stored in the DB 106 or another external database. The secure data block 128 may store a pointer or a link to the story, or story elements stored in the DB 106. In one embodiment, a single secure data block 128 may be used for the truth criteria, the stories (or links to the stories), and a map between the truth criteria and the stories. In one embodiment, the truth criteria, the stories, and the map between the truth criteria and the stories may each have a separate secure data block 128.

In one embodiment, the reporting tool 206 may also calculate a truth score for the reported story. The truth score may be a percentage or a value based on a number of the truth criteria 108 that have been met. The truth score may also be used to let the author know if the author should include additional information in order for the story to be considered valid by the author's employer or the general public. For example, if 9 out of 10 of the truth criteria 108 associated with a war news story have been met, the reporting tool 206 may include a truth score of 90% or a value of 90. In one embodiment, different threshold scores may be associated with different color coded icons that indicate a trusted story, a questionable story, or a false story. The color coded icons can be shown to a user to allow the user to quickly ascertain the trustworthiness of a story. For example, stories with scores over 90 may be have a green color icon, stories with scores between 50-90 can have a yellow color icon, and stories with scores below 50 can have a red color icon.

Referring back to FIG. 1, the system 100 may include the user location 116. The user location 116 may have a user 122 that is surfing the Internet via a web browser executed on an endpoint device 124. The endpoint device 124 may be a desktop computer, a laptop computer, a tablet computer, a smart phone, and the like. The user 122 may also log into the system 100.

When the user 122 is logged into the system 100, the AS 104 may cause a shell application 210 to be executed on the endpoint device 124 of the user 122. The shell application 210 may be an application that allows a web browser to be executed within the shell application 210 to provide a way for the user 122 to quickly validate an information source, a story, an article, and the like, found on the Internet via the web browser executed on the endpoint device 124.

Figure 3:
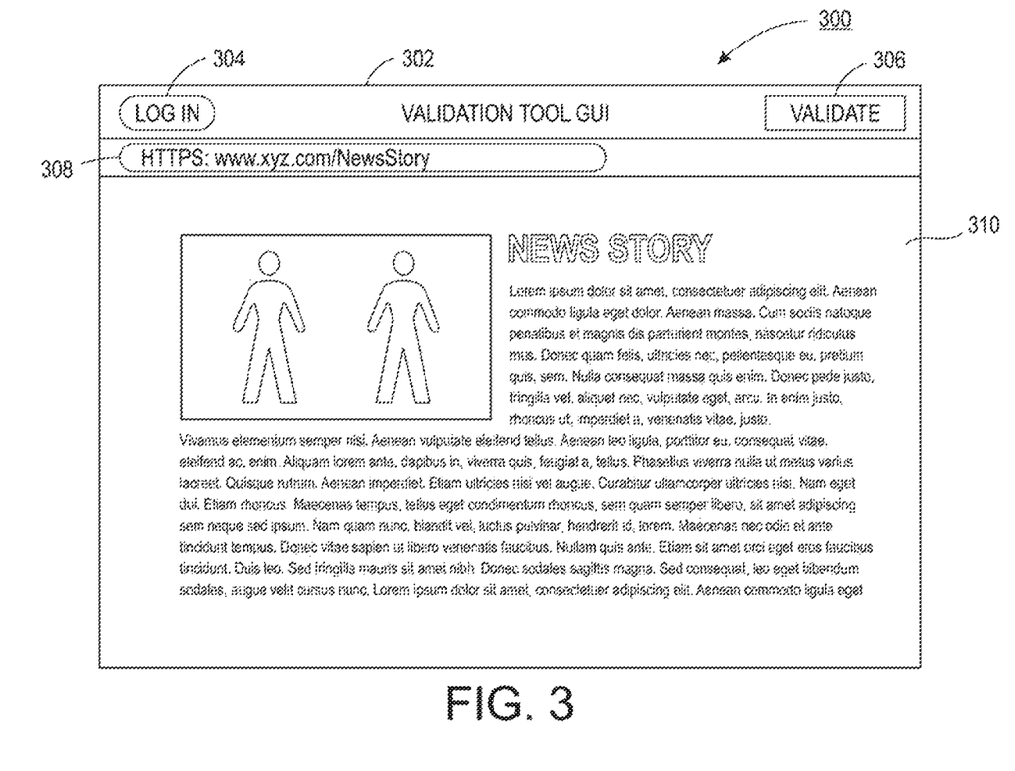
FIG. 3 illustrates an example graphical user interface (GUI) of the present disclosure.

FIG. 3 illustrates an example screenshot 300 of the shell application 210. In one example, the shell application 210 may provide a GUI 302. The GUI 302 may include a log in button 304, and a validate button 306. In one embodiment, the validate button 306 may also include a machine readable code (e.g., a bar code or a quick response code). As a result, the machine readable code can be scanned and the information can be retrieved on another endpoint device (e.g., a mobile device of the user 122).

In one embodiment, a user 122 may execute a web browser 308 within the shell application 210. The user 122 may find a news story 310 while surfing the Internet. The news story 310 may be published in a news company website, a general news website, a social media website, and the like.

In one embodiment, when the user 122 is logged into the system 100, the user may simply click on the validate button 306. The validate button 306 in the shell application 210 may cause the AS 104 to execute the validation tool 208. The validation tool 208 may automatically search for the news story 310 in the secure data blocks 128. If the news story 310 is not found, the GUI 302 may indicate that the news story 310 was not logged through the system 100. Thus, the user 122 may assume that the validity or truthfulness of the news story 310 is uncertain or questionable.

Figure 4:
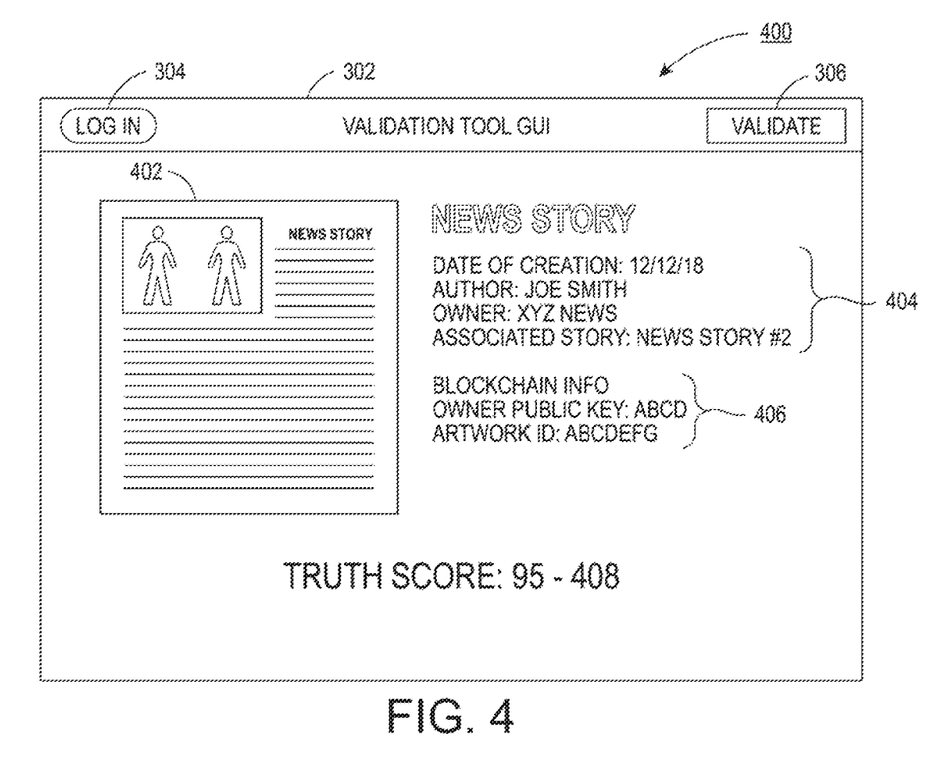
FIG. 4 illustrates another example GUI of the present disclosure

However, if the news story 310 is found in the secure data blocks 128, the validation tool 208 may provide the information to the shell application 210 for display. The shell application 210 may provide the information in a screenshot 400, as illustrated in FIG. 4. The screenshot 400 may include an image 402 of the original news story 310 to allow the user 122 to confirm that the correct news story has been found in the secure data blocks 128. The screenshot 400 may also include information 404 that may have been used to meet the truth criteria 108. The information 404 may include a date of creation, an author, an owner of the story, associated news stories and/or hyperlinks to similar stories, a location of the story, and the like, that demonstrate that the story maps (or does not map) to its truth criteria.

The screenshot 400 may also include secure data block information 406. The secure data block information 406 may be include the owner public key, artwork identification, and the like. The secure data block information 406 may be encrypted to prevent any individual from trying to access and/or modify the one or more secure data blocks 128 that contain the information associated with the news story 310.

The screenshot 400 may also include a truth score 408. As noted above, the truth score 408 may be a number, a percentage, or may be a color coded icon to allow the user 122 to quickly asses a validity or truthfulness of the information source or news story.

The screenshot 400 may include additional information and/or hyperlinks that are not shown. For example, the screenshot 400 may include links to a website where the story was original published. In one example, the screenshot 400 may include a user interface to post questions and receive answers. For example, the user 122 may post questions regarding the news story 310. A notification may be sent to the author 118 via the user interface 110 on the endpoint device of the author 118. The author 118 may submit answers to the questions, which may then be viewed by the user 122, and so forth. Therefore, the user 122 may be able to see a summary of whether the story may or may not be true, and also may be able to see details of how that summary was determined.

As a result, the system 100 leverages the security of the secure data blocks 128 to store and validate information sources and/or news stories. The secure data blocks 128 (e.g., blockchain technology) allow the truth criteria 108 to be established without fear of hacking or being compromised. The truth criteria 108 may then set an industry standard for news stories that are reported or any type of information that is published. The user interface 110 with the shell application 210 may provide a unique interface that allows a user to quickly assess the validity of information with a click of a button, rather than having to spend hours to search on their own.

Figure 5:
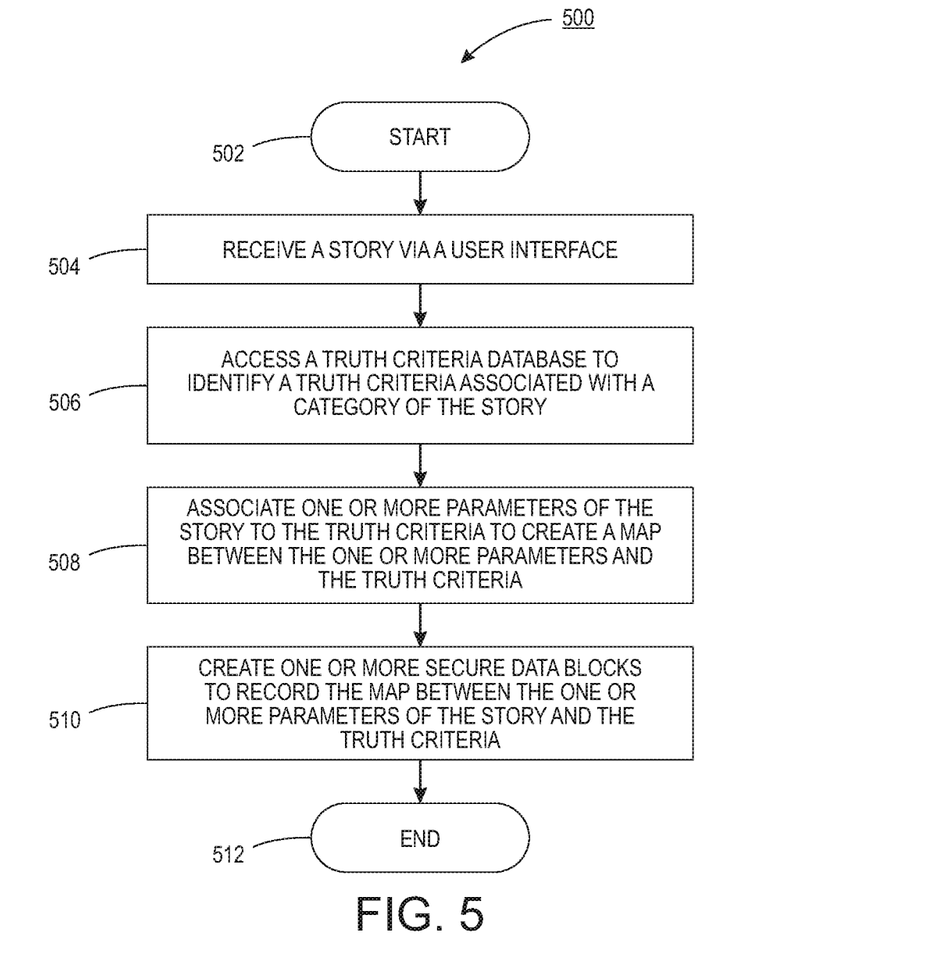
FIG. 5 illustrates a flowchart of an example method for creating a secure data block to validate an information source of the present disclosure.
Figure 6:
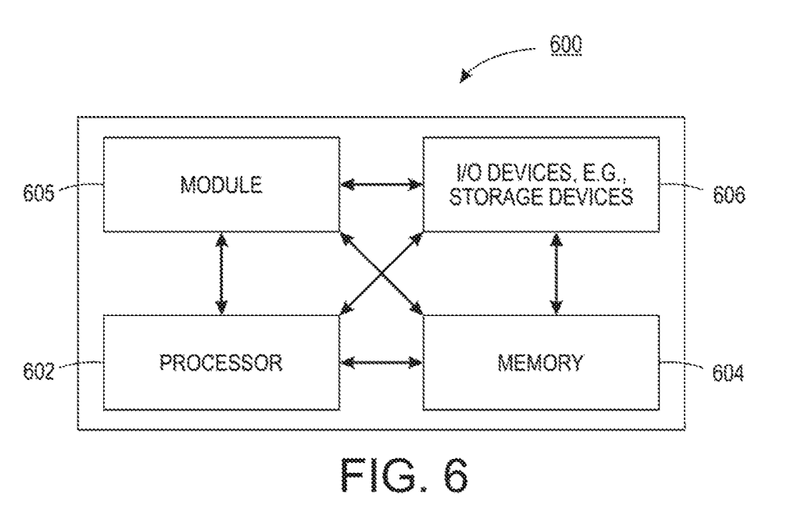
FIG. 6 illustrates a high-level block diagram of an example computer suitable for use in performing the functions described herein.

FIG. 5 illustrates a flowchart of an example method 500 for creating a secure data block to validate an information source. In one embodiment, one or more blocks of the method 500 may be performed by the apparatus 104, or a computer/processor that controls operation of a computing device as illustrated in FIG. 6 and discussed below.

At block 502, the method 500 begins. At block 504, the method 500 receives a story via a user interface. For example, a reporter may be at a location reporting on a news story. The reporter may want to publish the news story on the Internet. The reporter may log into a validation system to report the story via the user interface of the validation system. The story may include text, audio, video, or any other type of multi-media file that may have been generated at the location of the story.

At block 506, the method 500 accesses a truth criteria database to identify a truth criteria associated with a category of the story. In one embodiment, the news story may be for a particular category of news story. The database may store a plurality of different truth criteria for different types or categories of news stories that are pre-defined by a consortium. As discussed above, the truth criteria for each type of news story may be established by a consortium within the industry of the type of news story. Block chains may be generated for the truth criteria to store the truth criteria.

At block 508, the method 500 associates one or more parameters of the story to the truth criteria to create a map between the one or more parameters and the truth criteria. As discussed above, the reporter may enter the parameters for each criteria of the truth criteria via the user interface. In another example, the parameters may be automatically obtained by executing a smart contract. The parameters may be obtained from meta-data of multi-media files or from external sources. The parameters may include information associated with the story. For example, the parameters may include a location of the story, travel information of the author, employment verification of the author, documentation of conversations held with human sources, receipts at a location where the story was generated, and the like.

In one embodiment, a truth score may be calculated for the story based on the parameters that are associated with the truth criteria. For example, the truth score may be a percentage of the truth criteria that has been met by the story.

At block 510, the method 500 creates one or more secure data blocks to record the map between the one or more parameters of the story and the truth criteria. The secure data blocks may ensure that the parameters associated with the news story and the news story itself, and a map between the story and its associated criteria, cannot be modified or altered. Thus, the security of the secure data blocks (e.g., blockchain technology) can be leveraged to ensure the integrity of the story and the parameters associated with the story to validate the associated truth criteria.

Once the news story, or a link to the story, is stored in the distributed database of secure data blocks, the news story may be available for validation when found by a user surfing the web. For example, a user may be logged into a validation system and surfing the Internet via a web browser executed within a shell application of the validation system. The user may come across an article or story that looks interesting, but the user would like to validate the information or the trustworthiness of the story.

In one embodiment, the user may click on a validate button in the shell application to request validation of the story. The method may access the one or more secure data blocks of the one or more parameters of the story that are associated with the truth criteria. The one or more parameters of the story may then be displayed via the user interface or the shell application along with its map to its associated truth criteria, as described above. The user may then quickly assess the validity or trustworthiness of the information or story via the user interface. At block 512, the method 500 ends.

FIG. 6 depicts a high-level block diagram of a computer that is dedicated to perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for creating a secure data block to validate an information source, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for creating a secure data block to validate an information source (e.g., a software program comprising computer-executable instructions) can be loaded into memory 604 and executed by hardware processor element 602 to implement the steps, functions or operations as discussed above in connection with the example method 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for creating a secure data block to validate an information source (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for creating a secure data block to validate an information source, comprising:
   receiving, by a processor, a request from a user to publish a story via a user interface;
   accessing, by the processor, a truth criteria database to identify a truth criteria associated with a category of the story, wherein the truth criteria is one of a plurality of different truth criteria and each one of the plurality of different truth criteria is associated with a different category of stories;
   prompting, by the processor, the user to provide information associated with the story via the user interface at a time the user requests to publish the story via the user interface;
   associating, by the processor, one or more parameters of the story to the information provided by the user for the truth criteria to create a map between the one or more parameters and the truth criteria, wherein the associating is performed automatically by a smart contract executed by the processor as the story is received, wherein the smart contract extracts metadata from the story that provide the one or more parameters and collects information from an external system, wherein the metadata comprises global positioning system (GPS) information indicating where the story was created and a date and time the story was created, wherein the external system comprises a calendar application of an author to verify travel plans and appointments;
   creating, by the processor, one or more secure data blocks to record the map between the one or more parameters of the story and the truth criteria;
   receiving, by the processor, a log-in via the user interface to execute a shell application that is to execute a web browser within the shell application;
   receiving, by the processor, a request to validate the story via the user interface by selection of a validate button on a web page opened in the web browser;
   accessing, by the processor, the one or more secure data blocks of the one or more parameters of the story that are associated with the truth criteria; and
   displaying, by the processor, the one or more parameters of the story that are associated with the truth criteria and secure data block information comprising an owner public key for a secure data block of the story via the web browser in the shell application.

2. The method of claim 1, wherein the displaying further comprises displaying a truth score based on a number of the truth criteria that is correlated to the one or more parameters of the story.

3. The method of claim 1, wherein the truth-criteria database comprises a plurality of pre-defined truth criteria associated with different categories of stories.

4. The method of claim 1, wherein the story comprises at least one of: text or multi-media files.

5. The method of claim 1, wherein the truth criteria comprises at least one of: an authorship validation, a reporting location validation, an electronic content location validation, a research location validation, a research document source validation, or a human source validation.

6. A non-transitory computer-readable medium storing a plurality of instructions, which when executed by a processor, causes the processor to perform operations for creating a secure data block to validate an information source, comprising:

receiving a request from a user to publish a story via a user interface;

accessing a truth criteria database to identify a truth criteria associated with a category of the story, wherein the truth criteria is one of a plurality of different truth criteria and each one of the plurality of different truth criteria is associated with a different category of stories;

prompting the user to provide information associated with the story via the user interface at a time the user requests to publish the story via the user interface;

associating one or more parameters of the story to the information provided by the user for the truth criteria to create a map between the one or more parameters and the truth criteria, wherein the associating is performed automatically by a smart contract executed by the processor as the story is received, wherein the smart contract extracts metadata from the story that provide the one or more parameters and collects information from an external system, wherein the metadata comprises global positioning system (GPS) information indicating where the story was created and a date and time the story was created, wherein the external system comprises a calendar application of an author to verify travel plans and appointments;

creating one or more secure data blocks to record the map between the one or more parameters of the story and the truth criteria;

receiving a log-in via the user interface to execute a shell application that is to execute a web browser within the shell application;

receiving a request to validate the story via the user interface by selection of a validate button on a web page opened in the web browser;

accessing the one or more secure data blocks of the one or more parameters of the story that are associated with the truth criteria; and displaying the one or more parameters of the story that are associated with the truth criteria and secure data block information comprising an owner public key for a secure data block of the story via the web browser in the shell application.

7. The non-transitory computer-readable medium of claim 6, wherein the displaying further comprises displaying a truth score based on a number of the truth criteria that is correlated to the one or more parameters of the story.

8. The non-transitory computer-readable medium of claim 6, wherein the truth-criteria database comprises a plurality of pre-defined truth criteria associated with different categories of stories.

9. The non-transitory computer-readable medium of 6, wherein the story comprises at least one of: text or multi-media files.

10. The non-transitory computer-readable medium of claim 6, wherein the truth criteria comprises at least one of: an authorship validation, a reporting location validation, an electronic content location validation, a research location validation, a research document source validation, or a human source validation.

11. A method for creating a secure data block to validate an information source, comprising:

receiving, by a processor, a request from a user to publish a story and a multi-media file associated with the story via a user interface;

extracting, by the processor, metadata from the multi-media file;

receiving, by the processor, travel information of a reporter to a location of the story and information from an external system, wherein the external system comprises a calendar application of an author to verify travel plans and appointments;

accessing, by the processor, a truth criteria database to identify a truth criteria associated with a category of the story, wherein the truth criteria is one of a plurality of different truth criteria and each one of the plurality of different truth criteria is associated with a different category of stories;

prompting, by the processor, the user to provide information associated with the story via the user interface at a time the user requests to publish the story and the multi-media file via the user interface;

mapping, by the processor, one or more parameters obtained from the metadata, the travel information, and the information from the external system to the information provided by the user for the truth criteria to create a map between the one or more parameters and the truth criteria, wherein the mapping is performed automatically by a smart contract executed by the processor as the story is received, wherein the metadata comprises global positioning system (GPS) information indicating where the story was created and a date and time the story was created;

creating, by the processor, one or more blockchain to record the map between the one or more parameters of the story and the truth criteria, wherein the one or more blockchains are accessed in response to a request to validate the story via the user interface;

receiving, by the processor, a log-in via the user interface to execute a shell application that is to execute a web browser within the shell application;

receiving, by the processor, a request to validate the story via the user interface by selection of a validate button on a web page opened in the web browser;

accessing, by the processor, the one or more secure data blocks of the one or more parameters of the story that are associated with the truth criteria; and displaying, by the processor, the one or more parameters of the story that are associated with the truth criteria and secure data block information comprising an owner public key for the one or more blockchains via the web browser in the shell application.

* * * * *